Jan. 5, 1932. E. V. SWANGREN 1,839,450
NAIL CAPPING MACHINE
Filed July 11, 1929 8 Sheets-Sheet 2
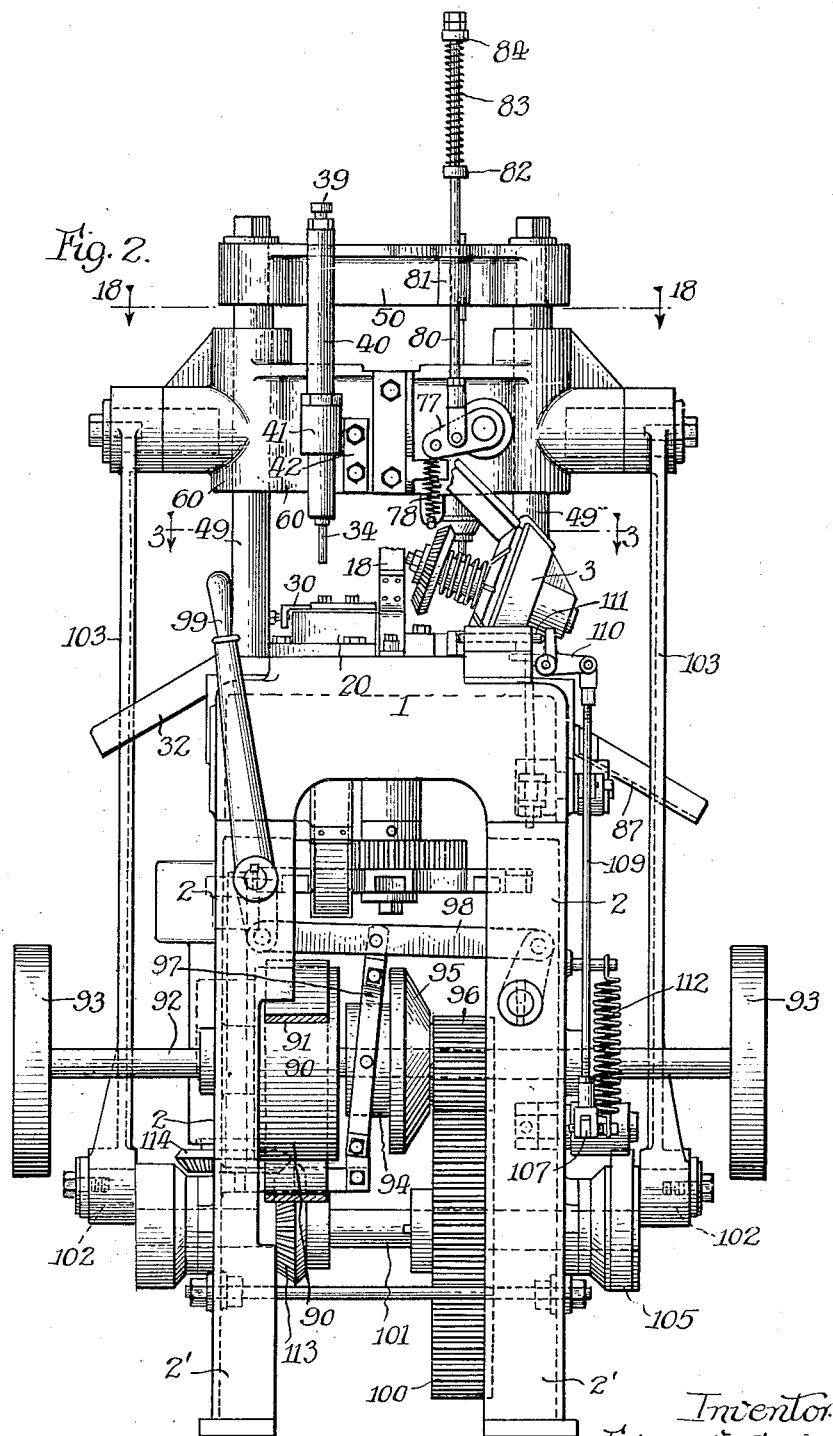

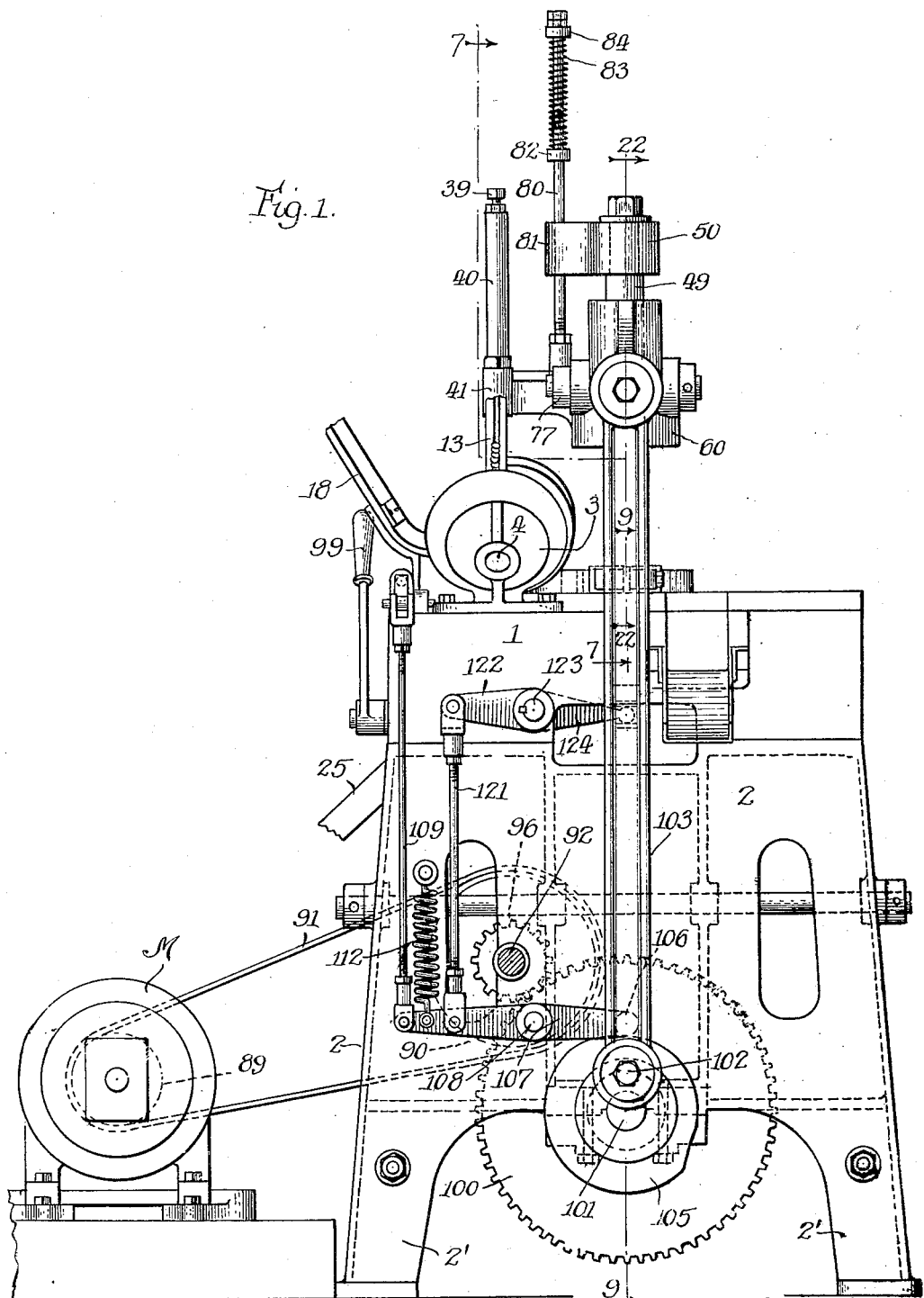

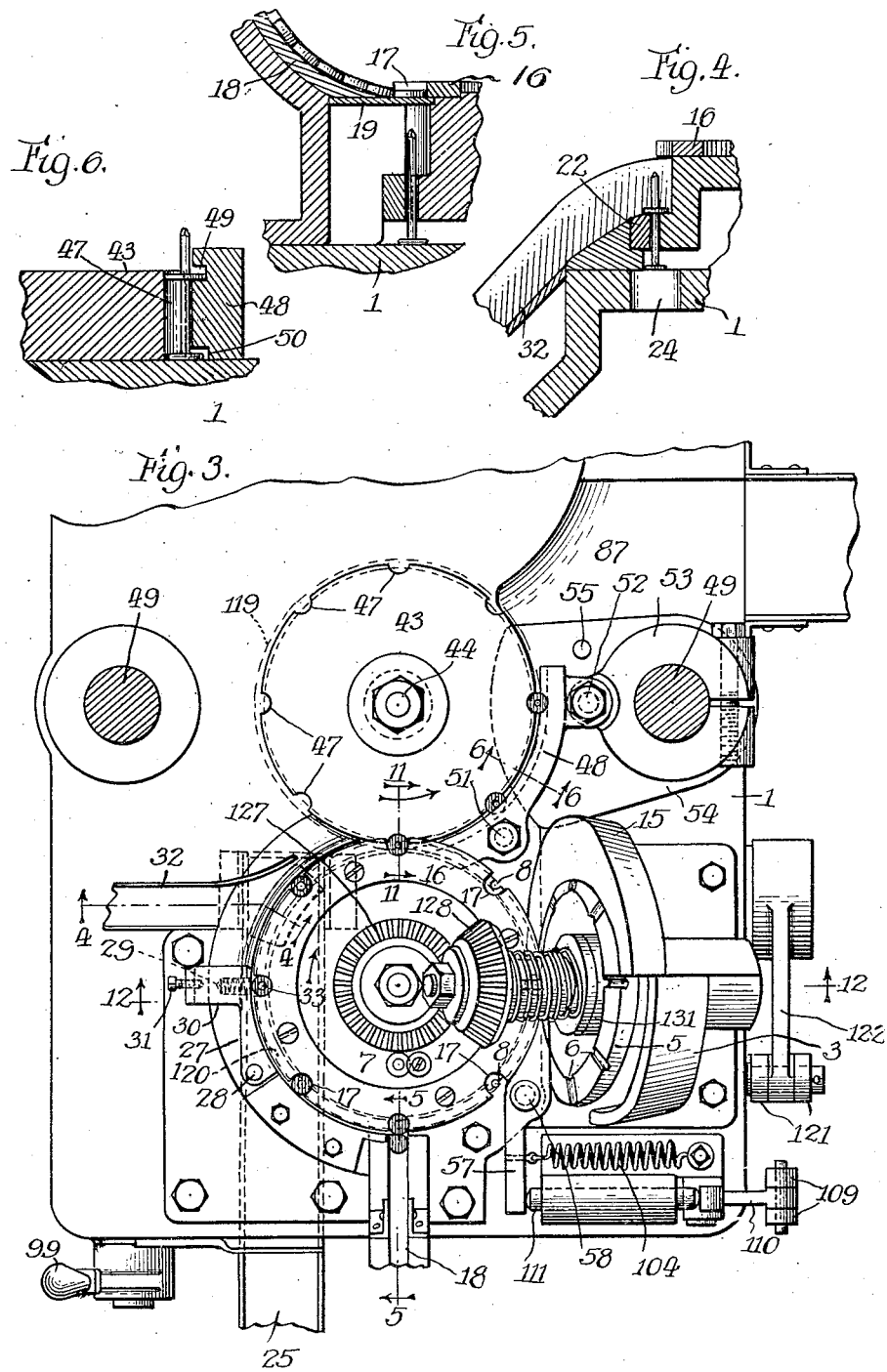

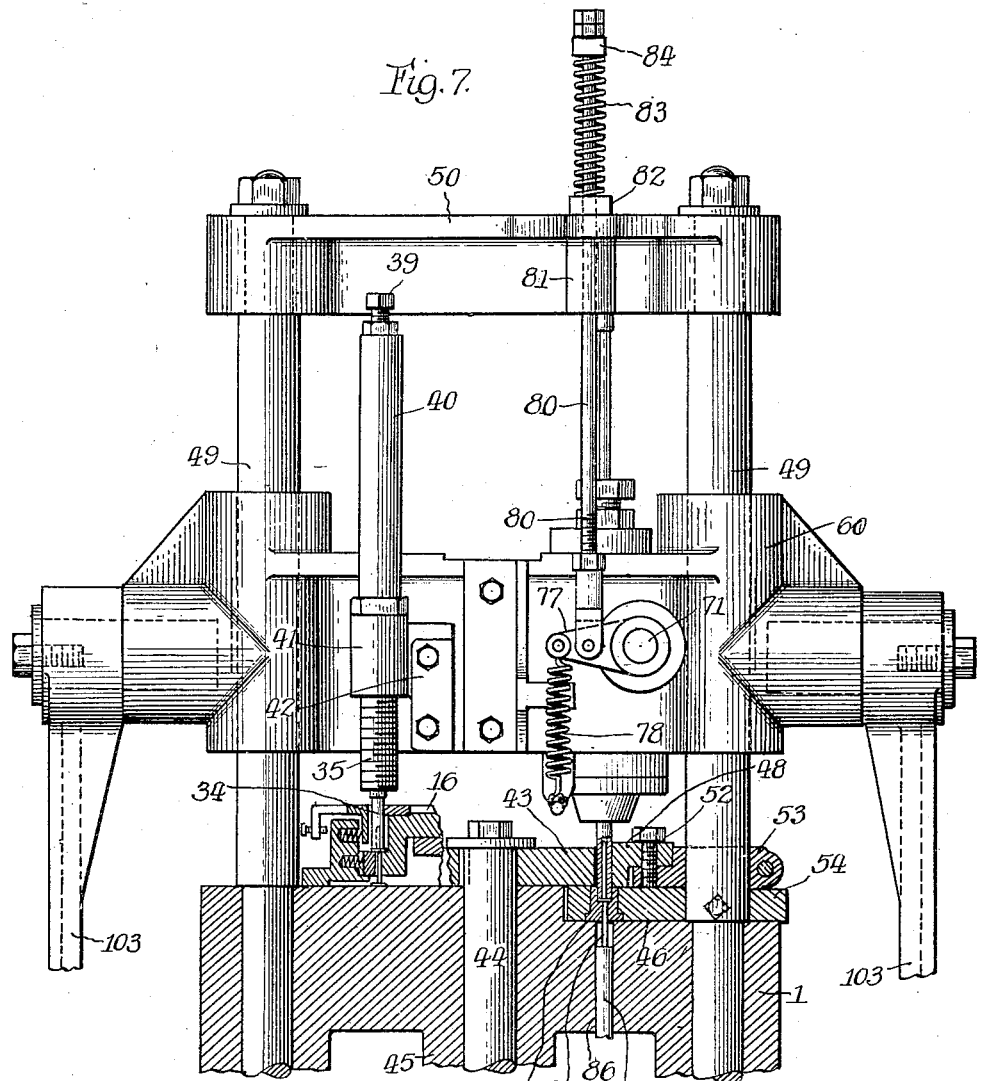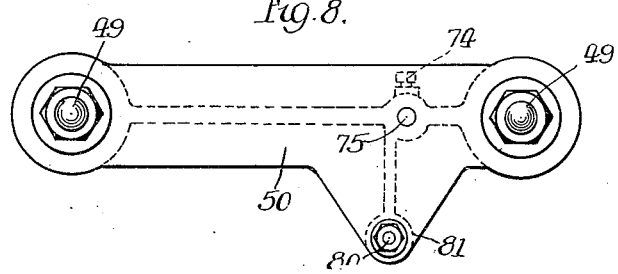

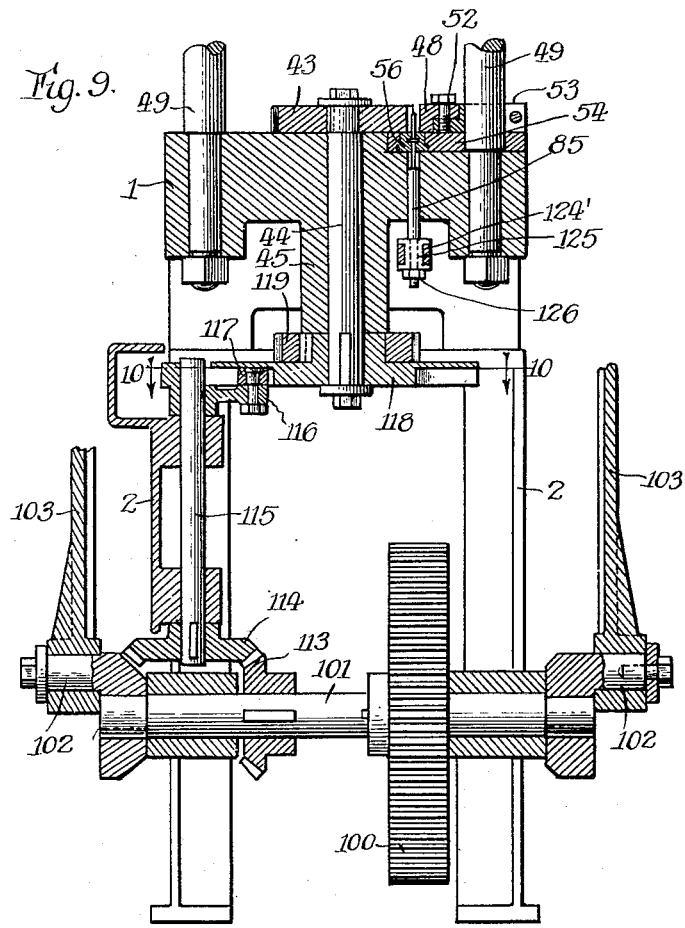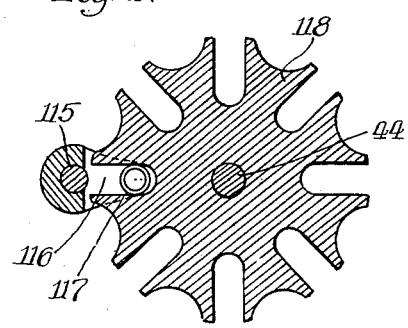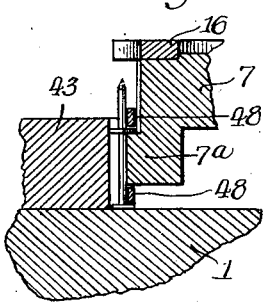

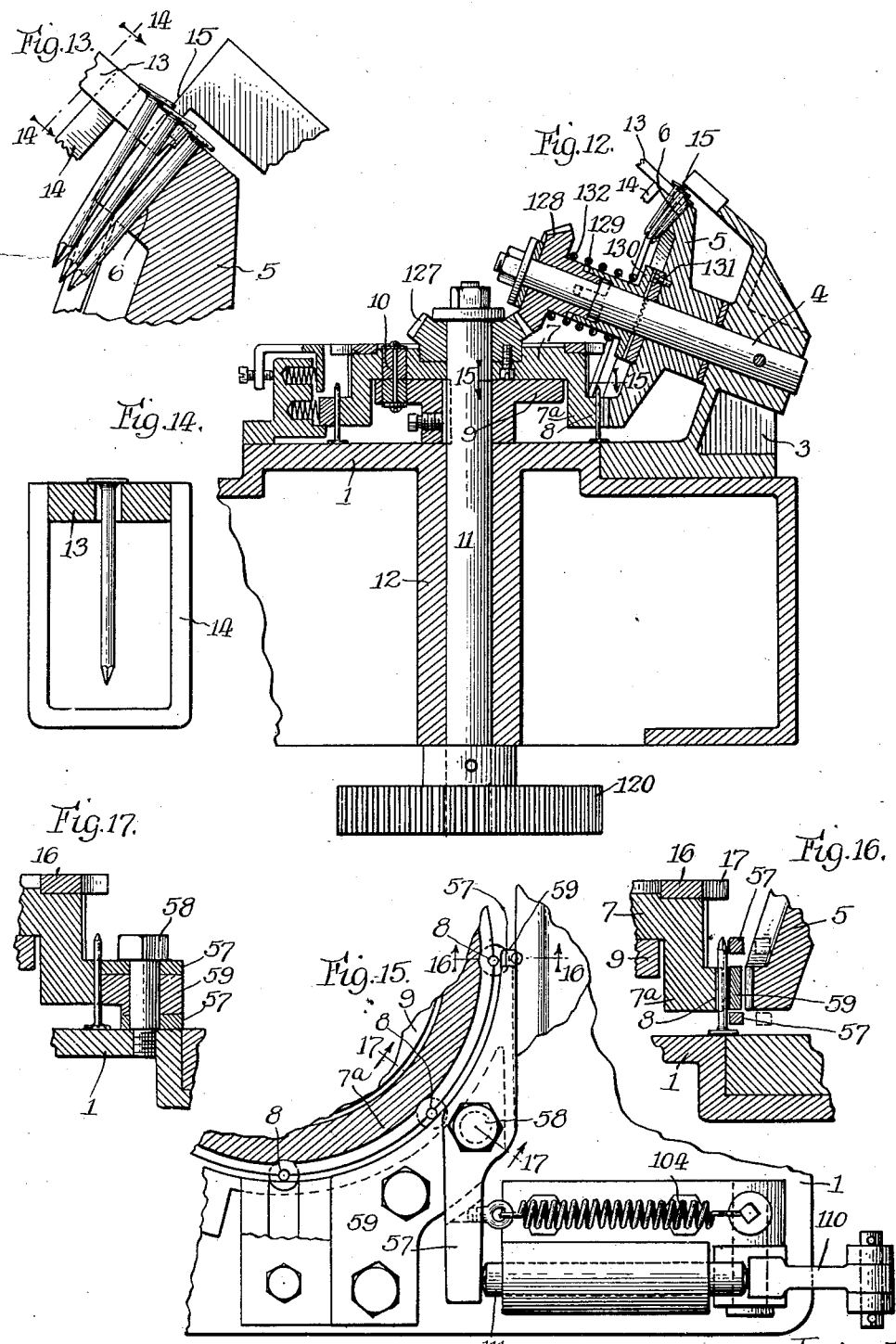

Jan. 5, 1932.                E. V. SWANGREN                1,839,450
                           NAIL CAPPING MACHINE
                  Filed July 11, 1929        8 Sheets-Sheet 7
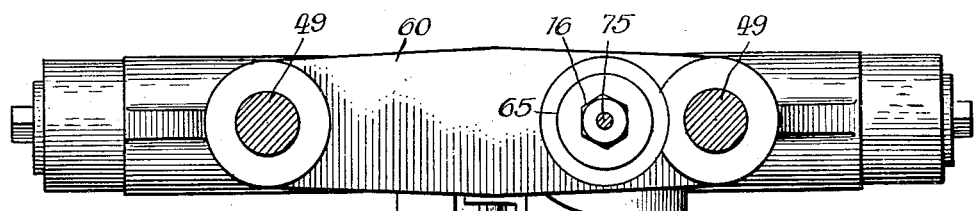
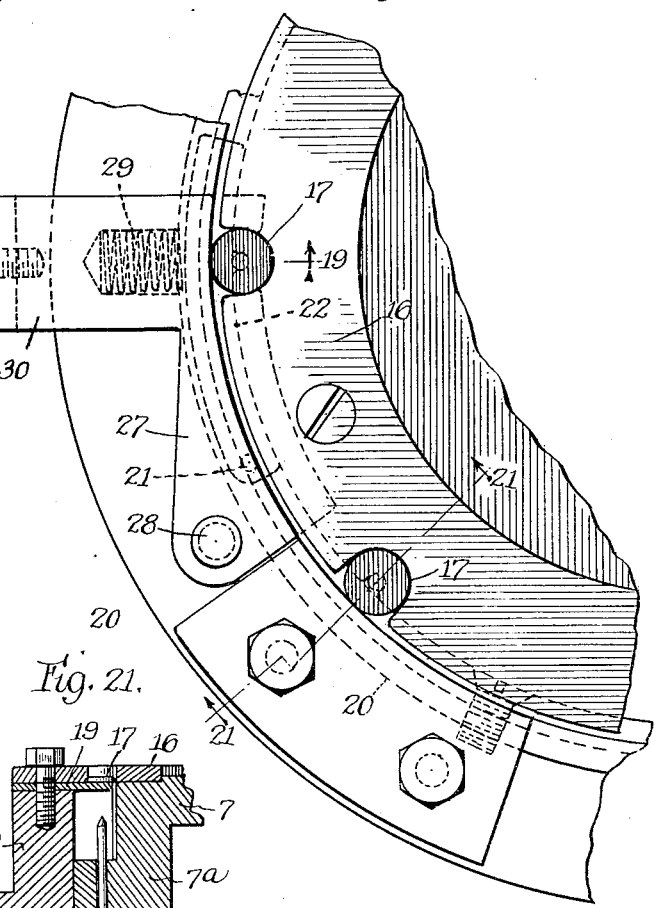
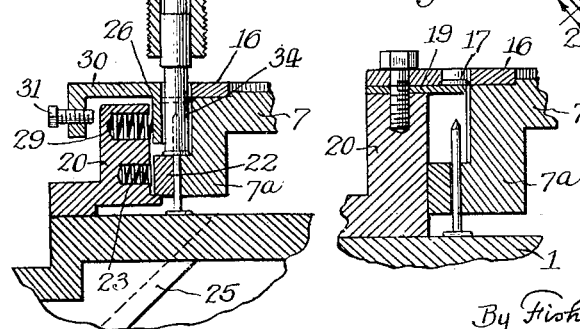
Inventor:
Edwin V. Swangren,
By Fisher, Clapp, Soans & Pond, Attys.

Jan. 5, 1932.  E. V. SWANGREN  1,839,450
NAIL CAPPING MACHINE
Filed July 11, 1929  8 Sheets-Sheet 8

Inventor:
Edwin V. Swangren,
By Fisher, Clapp, Soans + Pond, Attys.

Patented Jan. 5, 1932

1,839,450

UNITED STATES PATENT OFFICE

EDWIN V. SWANGREN, OF MAYWOOD, ILLINOIS, ASSIGNOR TO ALBERT J. DENISTON, JR., OF CHICAGO, ILLINOIS

NAIL CAPPING MACHINE

Application filed July 11, 1929, Serial No. 377,425, and in Canada April 6, 1929.

My invention relates to an improved power-operated machine for permanently securing lead caps or washers on the heads and shanks of wire nails. Lead-headed nails are at present quite extensively employed for securing sheet-metal roofing and siding to buildings, the function of the lead washer or cap being to effectively seal the hole in the sheet-metal through which the nail is driven against the ingress of moisture and prevent leakage through the rusting of the sheet-metal around the head and shank of the nail. The machine disclosed in the present application has been designed more especially for the manufacture of a lead-headed nail substantially like that disclosed in Letters Patent No. 1,576,727 granted March 16, 1926 to Albert J. Deniston, Jr., but, by suitable modification of the die matrix and plunger is capable of applying other specific forms of washers or cap to nails.

The principal object of the invention is to provide an efficient power-operated machine by which the lead washer blanks may be rapidly applied to and permanently die-pressed onto the head and shank of the nail by a continuous operation wherein the nails and washer blanks are separately fed to the machine, brought into register with each other and the washer forced over the stem of the nail and securely die-pressed around the neck and head of the latter.

Other objects of the invention are to provide efficient means for conducting the nails and blanks to the point at which they are to be united, to provide an improved means for first impaling the washer on the stem of the nail, to provide improved means for guiding the nail and washer to the field of operation of a cooperating die and die punch, to provide an improved die plunger for shaping and impressing the washer on the nail, and to provide means associated with the die punch operating mechanism to prevent injury to the punch in the event that it fails to register properly with a nail in the die matrix.

Still other objects and attendant advantages of the invention will be apparent to persons familiar with machines of this type from the following detailed description, taken in connection with the accompanying drawings in which I have illustrated one practical and workable embodiment of the invention, and wherein—

Fig. 1 is a side elevation of the machine;

Fig. 2 is a front elevation, viewed from the left of Fig. 1;

Fig. 3 is an enlarged plan view partly in section on the lne 3—3 of Fig. 2;

Fig. 4 is a detail vertical section on the line 4—4 of Fig. 3;

Fig. 5 is a detail vertical section on the line 5—5 of Fig. 3;

Fig. 6 is a detail vertical section on the line 6—6 of Fig. 3;

Fig. 7 is an enlarged view of the upper portion of the machine showing the reciprocating cross-head and its guides in elevation, and the underlying washer applying mechanism in vertical section on the line 7—7 of Fig. 1;

Fig. 8 is a top plan view of the cross-head guide frame, looking downwardly on Fig. 7;

Fig. 9 is a vertical section on the line 9—9 of Fig. 1;

Fig. 10 is a horizontal section on the line 10—10 of Fig. 9;

Fig. 11 is an enlarged vertical sectional detail on the line 11—11 of Fig. 3;

Fig. 12 is a vertical section on the line 12—12 of Fig. 3;

Fig. 13 is an enlarged vertical section through the lower end of the nail chute and the nail receiving portion of the transfer wheel;

Fig. 14 is a sectional detail through the nail feed chute on the line 14—14 of Fig. 13;

Fig. 15 is an enlarged horizontal section on the line 15—15 of Fig. 12;

Fig. 16 is an enlarged vertical section on the line 16—16 of Fig. 15;

Fig. 17 is an enlarged vertical section on the line 17—17 of Fig. 15;

Fig. 18 is an enlarged section on the line 18—18 of Fig. 2, showing the cross-head and parts carried thereby in top plan;

Fig. 19 is a vertical section through the washer applying hammer and the cooperating parts of the nail carrier on line 19—19 of Fig. 20;

Fig. 20 is a fragmentary top plan of the washer applying turret and its guard wall;

Fig. 21 is a vertical sectional detail on the line 21—21 of Fig. 20;

Figure 22:
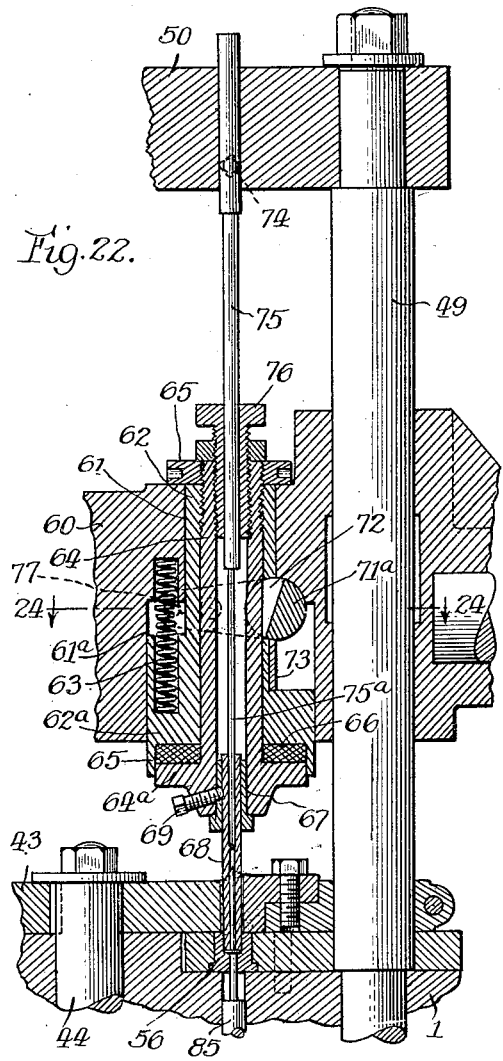
Fig. 22 is a vertical section through the die and die punch, showing the latter locked to the reciprocating cross-head carrying the same.
Figure 23:
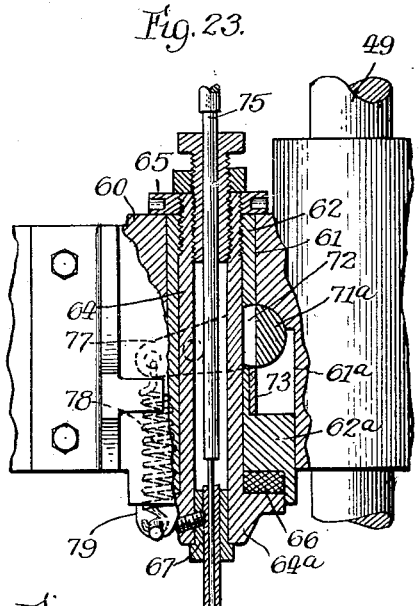
Fig. 23 is a view similar to Fig. 2 but showing the die punch in unlocked position.

Referring to the drawings, 1 designates a rectangular horizontal table or platform supported on side frames 2 and four corner legs 2', said table and its side frames and legs forming a hollow frame that carries the principal operating parts of the machine. Mounted on one side of table 1 is a hollow casting 3 formed with an inclined bearing to receive a fixed shaft 4 (Fig. 12), on which shaft is journaled a nail transfer wheel 5. The wheel 5 is formed with a beveled annular peripheral face in which are spaced radial nail-receiving notches or pockets 6 most clearly shown in Figs. 3 and 13. Cooperating with the transfer wheel 5 is a horizontal turret 7 formed with a depending annular peripheral flange 7ª, a narrow ledge portion of which is formed with spaced vertical notches 8 that receive the nails in inverted position from the transfer wheel 5, the head of the nail resting on the table 1, as clearly shown in Figs. 12 and 16. The turret 7 is supported on an underlying disk 9 (Fig. 12) to which it is attached by a well-known safety fastening 10, and the disk 9 is keyed to a vertical shaft 11 journaled in a long bearing boss 12 on the under side of table 1.

Cooperating with the transfer wheel 5 is a gravity nail feed device consisting of an inclined longitudinally slotted bar 13 supported at intervals by U-brackets 14, the nails hanging through the slots suspended by their heads and dropping by gravity into the notches of the transfer wheel, as clearly shown in Fig. 13. A shield 15 attached to the casting 3 overhangs the periphery of that half of the transfer wheel that is traveling downwardly carrying the nails and prevents the nails from accidentally falling out of their seats.

The nails are bodily transferred from the periphery of the transfer wheel 5 to the peripheral notches 8 of the turret 7 by a pivoted switch 57 (Figs. 15, 16 and 17) that is pivoted at 58 on a guard wall 59 attached to the table 1 and lying opposite the periphery of the turret. The switch 57 is forked, as clearly shown in Fig. 16, and straddles the peripheral portion of the transfer wheel 5, and, as each nail slides over the inner side of the forked end of the switch, the latter is given a slight swing toward the turret, by which the nail is transferred to the latter. The mechanism for actuating this switch will be described later.

Attached to the top of the turret 7 is a ring 16 formed with peripheral semi-circular notches 17 larger than and registering with the notches 8 of the turret. These notches receive the circular flat soft metal washer blanks which slide by gravity down a feed chute 18 (Figs. 3 and 5). Each blank, from the point at which it is received in a notch 17 to a point short of the point where it is driven onto a nail, is supported by a thin plate 19 (Fig. 5) that is attached to a circular guard wall 20 mounted on the table 1 and encircling about one-half of the periphery of the turret wheel 7, beyond the guard wall 59, these guard walls serving to confine the nails in the notches of the turret as the latter rotates step-by-step, as hereinafter described. After a nail and a blank intended therefor have traveled about 90 degrees from the point of entry of the washer blank, the latter is driven down on the stem of the nail about half way by a reciprocating hollow hammer or punch hereinafter described. During this operation the nail requires to be confined in a vertical position to receive the blank as the latter is impaled thereon, and the blank requires to be pinched edgewise to support it above the point of the nail since at this point in the operation the blank has passed off the end of the supporting plate 19. To confine the nail, in an undercut portion of the wall 20 there is pivoted at 21 (Fig. 20) a guard bar 22 (Figs. 19 and 20) that is pressed toward the turret wheel by a spring 23. The free end of this guard bar extends somewhat beyond the point at which the blank is driven onto the nail, as shown in Fig. 20; and beneath its free end portion there is a hole 24 (Fig. 4) formed through the table 1 through which any nail that fails to receive a washer drops into a nail throwout chute 25 (Fig. 1). Of course, a nail which has received its washer is supported by the latter during its travel over the hole 24, as shown in Fig. 4. The washer blank, after passing off the end of the supporting plate 19, is pressed edgewise against the wall of its notch 17 by a presser plate 26 located above the guard bar 22 (Fig. 19), this plate 26 being formed integral with an arm 27 overlying and pivoted at 28 (Fig. 20) to the fixed guard wall 20.

The plate 26 is urged inwardly toward the turret wheel by a spring 29 (Fig. 19). The washer blank is thus clamped edgewise in position to be struck and driven down onto the nail, as clearly indicated in Fig. 19. To prevent the presser plate 26 from swinging so far inwardly as to be struck by the hammer in the event of the failure of a blank, its arm 27 is formed with a finger 30 carrying a stop screw 31 adapted to contact with the wall 20. In the event of the failure of a nail to meet a washer, the washer is simply driven down below the lower edge of the presser plate 26, and is carried along on the notched flange of the turret wheel until it reaches a downwardly inclined throw-out chute 32 (Fig. 4) through which it is discharged from the machine by gravity. It will thus be seen that the machine automatically expels nails which fail to meet washer blanks, and washer blanks which fail to meet nails. This prevents clogging of the machine, and the mixture of faulty parts with the finished product.

The washer blanks are driven about halfway down onto the stems of the nails by the spring hammer best shown in Fig. 19. This consists of a steel punch 33 formed with a tubular nose 34 adapted to telescope over the stem of the nail and slidable and guided in an externally threaded sleeve 35. The punch 33 is forced downwardly relatively to its sleeve 35 by a stiff thrust spring 36 confined between the head 37 of the punch and an adjustable abutment block 38 that is mounted by means of an adjusting screw 39 in the upper end of a tubular casing 40 that screws onto the upper end of sleeve 35. Sleeve 35 is mounted in a collar 41 that is attached by a bracket 42 (Fig. 7) to a vertically reciprocating cross-head hereinafter described. It will thus be seen that the hammer blow is a cushioned blow imparted through the spring 36.

Passing now to the mechanism by which the nails, with the washer blanks impaled thereon, are transferred to a second turret which deposits them in a die matrix, the washers are die-pressed around the heads and necks of the nails, and the finished nails are ejected from the machine, and referring first to Figs. 3 and 9, directly behind the turret 7 is a second turret 43 that is keyed on the upper end of a vertical shaft 44 journaled in a long bearing boss 45 on the under side of table 1. In the periphery of turret 43 are spaced notches 47 (Figs. 3 and 6) which, as the two turrets turn in opposite directions, move into and out of register with the notches 8 of turret 7. Lying opposite a portion of the periphery of turret 43 is a fixed guard wall 48, the inner surface of which, as shown in Fig. 6, is channeled at 49 and 50 to accommodate the washer and the head of the nail. As shown in Figs. 3 and 11, one end of the guard wall 48 is forked and straddles the peripheral ledge portion of the turret flange $7^a$ in which the notches 8 are formed at the point of tangency of the two turrets, and functions as a switch to shift the nails from the turret 7 to the turret 43.

Referring to Figs. 7, 8 and 9 mounted in the table 1 are a pair of vertical guide rods 49, rigidly connected at their upper ends by a stationary cross-head 50. The guard wall 48 is secured in position by a screw 51 (Fig. 3) mounted in the table 1 and by another screw 52 which, as shown in Fig. 9, attaches the guard wall to a split collar 53 mounted on one of the guide rods 49. Swiveled on the same guide rod 49 directly beneath the collar 53 is a segment plate 54 (Fig. 3) which occupies a countersunk portion 46 of the table top and is secured in fixed position relatively to the table 1 by a removable dowel pin 55. In this segment plate 54 is mounted a steel die matrix 56, most clearly shown as to its detail form in Fig. 26. As each nail reaches a position directly above the matrix, the head and neck of the nail drop into the latter, to receive the final die punch operation.

Figure 26:
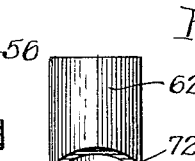
Fig. 26 is an enlarged sectional detail of the punch nose and die matrix by which the washer is formed and pressed onto the nail.
Figure 25:
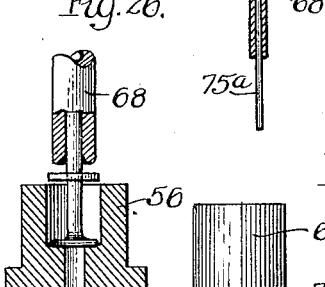
Fig. 25 is an elevational detail of a portion of the die plunger lock.

Describing next the die punch and its operating mechanism, 60 designates a reciprocating cross-head slidably mounted on the guide rods 49, this being the cross-head to which the bracket 42 and collar 41 carrying the washer applying hammer or punch are secured. Referring to Figs. 22 to 25 inclusive, cross-head 60 is formed with a vertical bore 61, the lower half of which is enlarged as shown at $61^a$. Fitted into this bore is a bushing 62 formed with an enlarged lower portion $62^a$ occupying the enlargement $61^a$ of the bore. In the normal and regular operation of the machine, the bushing is stationary relatively to the cross-head, but in case of a fault to prevent injury to the die punch the bushing may yield upwardly against the pressure of a plurality of thrust springs 63 that are footed at their upper ends in sockets in the cross-head 60 and at their lower ends in sockets in the bushing enlargement $62^a$, as clearly shown in Fig. 22. Extending through the bushing 62, $62^a$ and coaxial therewith is a tube 64 threaded on its upper end to receive a nut 65 that overlies the upper end of bushing 62 and the top surface of the cross-head. Bushing 62 and tube 64 form elements of the punch proper, and tube 64 at its lower end has a head $64^a$ that enters a recess 65 in the lower end of the bushing enlargement $62^a$. A cushioning ring 66 of leather, felt or the like, is preferably interposed between the head $64^a$ and the bottom of the recess 65. Fitted into the head $64^a$ is a bushing 67, and within the latter is fitted the upper end portion of a smaller steel tube 68, the lower end or nose of which is suitably shaped, as shown in Fig. 26, to effect, in cooperation with the matrix and the head and shank of the nail, the desired final formation of the lead washer. The parts 64ª, 67 and 68 are united by a screw 69.

The downward movement of the cross-head 60 is transmitted to the tubular member 64 through a safety lock mechanism which is normally operative to key the punch to the cross-head, but which, in the event that the hollow punch member 68 fails to register accurately with the nail, is automatically rendered inoperative in order to prevent injury to the punch. By reference to Figs. 22 and 24, it will be observed that the cross-head 60 is formed with a transverse circular bore 70 that intersects the upper portion of the vertical bore enlargement 61ª, and in the transverse bore 70 is journaled a locking member consisting of a solid shaft 71, the inner intermediate portion of which is cut away to provide, on one side of the longitudinal axis of the shaft, a semi-circular portion or key 71ª. The lower portion of the bushing 62 at a point opposite the key 71ª is formed with a recess or opening 72 to admit the key 71ª; and to a flattened portion of the bushing extension 62ª, just below said opening, is attached a hardened steel wear plate 73 (Fig. 25), the upper edge of which registers with the lower portion of the recess 72 and is engaged by the key 71ª when the latter is in working position shown in Fig. 22. From the foregoing it will be seen that the downward movement of the cross-head is transmitted through the key 71ª, the wear plate 73, the bushing 62, 62ª, the cushion 66, the head 64ª, and the screw 69 to the blank engaging member 68 of the punch. At the time the punch member 68 is in position to engage with the nail, the key 71ª is in the idle or inoperative position shown in Fig. 23, and if at this time the punch does not telescope over the nail but strikes and is stopped by a bent or inclined nail, or any other obstruction the blow of the cross-head will not be transmitted, but the bushing 62, 62ª will simply yield upwardly against the relatively light thrust of the springs 63, thus saving the point of the punch from injury.

Adjustably secured in the stationary cross-head 50 as by a set screw 74 is a nail rod 75 which extends downwardly through a bearing bushing 76 threaded into the upper end of the tube 64 and has a reduced portion 75ª that extends down into the lower tubular member 68 of the die punch. This rod is, of course, stationary; and as the punch rises usually tending to bring the nail with it, the nail is arrested by the contact of its point with the lower end of the rod, and thus forced clear of the lower end of the punch.

Referring next to the means for actuating and controlling the key 71ª, on one end of the key shaft 71 is an arm 77, the free end of which is connected by a pull spring 78 to a bracket 79 attached to the lower face of the cross-head 60. This spring 78 normally holds the key 71ª in the inoperative position shown in Fig. 23. Attached to an intermediate portion of the arm 77, as shown in Figs. 2 and 7, is an upwardly extending rod 80 slidably mounted in a bearing boss 81 on the upper fixed cross-head 50 and extending some distance above the latter. Slidable on the rod 80 above the cross-head 50 is a collar 82 attached to the lower end of a coil spring 83, the upper end of which spring is similarly attached to a nut 84 on the upper end of the rod 80. As the cross-head descends on its working stroke carrying the parts of the punch with it, the collar 82 strikes the upper end of the boss 81, and under the further downward movement of the cross-head the spring 83 is compressed to a point at which it overcomes the pull of the spring 78, and swings the key member 71ª from the idle position shown in Fig. 23 to the operative position shown in Fig. 22, thus locking the punch to the cross-head at or just before the nose of the punch reaches the washer on the nail. Should the nail be bent, or for any other reason lie out of register with the punch, the punch will be forced upwardly thereby carrying the hardened plate 73 into overlapping position on the flat face of the key 71ª, so that, on the further descent of the cross-head, the spring 83 cannot throw the key into locking position, but will merely be idly compressed. This safety device forms an important and valuable feature of the present invention, in view of its capacity to save the steel punch points from injury and breakage resulting from imperfections in, or accidental displacements of, the nails.

After the punch has cleared the nail on its rising movement, the nail is kicked out of the die through the agency of another kick-out rod 85 (Figs. 7 and 22) that is slidable in a hole 86 in the table 1 registering with the die matrix, and is formed with a reduced upper end 85ª that engages a hole in the bottom of the matrix directly below the head of the nail. This kick-out device is actuated at the proper time by mechanism hereinafter described, and the ejected nail, with the washer die formed and pressed on its head and neck is swept by the turret 43 rotating counter-clockwise viewing Fig. 3 into a nail discharge chute 87.

Figure 24:
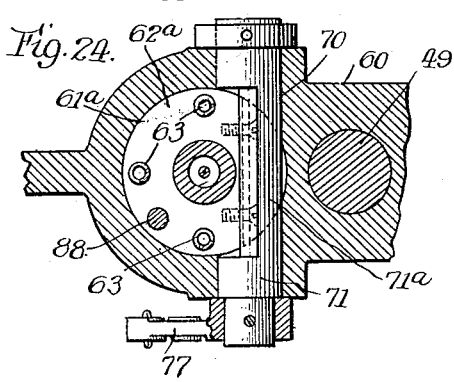
Fig. 24 is a horizontal section on the line 24—24 of Fig. 22.

Referring to Fig. 24, a dowel pin 88 anchored in the cross-head 60 slidably fits a hole in the bushing enlargement 62ª to prevent any rotary movement of the latter and thus maintain the locking recess 72 always in position to be engaged by the key 71ª.

Turning now to a description of the means for actuating the movable parts of the machine in synchronized relation, M (Fig. 1) designates an electric motor which, through pulleys 89 and 90 and a belt 91 drives a main power shaft 92 journaled in suitable bearings in the machine frame, the shaft 92 being preferably equipped with fly wheels 93 on its ends to steady its rotation. Splined on the shaft 92 is a slidable clutch member 94 (Fig. 2) that cooperates with a clutch member 95 that is loose on the shaft 92 and carries a pinion 96. The clutch member 94 is coupled to and disconnected from its cooperating clutch member 95 through the agency of a pivoted clutch shifter 97, a swinging link 98 and a hand lever 99, all as clearly shown in Fig. 2. The pinion 96, through a large gear 100 drives an underlying countershaft 101 journaled in the lower portion of the machine frame, and on the ends of said countershaft are cranks 102 which, through pitmen 103, raise and lower the reciprocating cross-head 60.

Referring to Figs. 1, 2, 3 and 15, the pivoted switch 57, by which the inverted nails are shifted from the transfer wheel 5 to the turret 7, is actuated on its working stroke by a pull spring 104 connected to the tail of the switch. It is actuated on its return stroke to a position behind the next nail (see the dotted line position shown in Fig. 16) by the following mechanism, best shown in Figs. 1, 2 and 3. Fast on shaft 101 is a cam disc 105 that is engaged by a collar 106 on the inner end of a lever 107 that is pivoted to one side of the machine frame at 108. To the other end of this lever 107 is adjustably connected a link 109, the upper end of which is connected to the horizontal arm of a bell crank lever 110 (Fig. 2). The vertical arm of the bell crank 110 lies opposite the outer end of a sliding rod 111 (Fig. 15), the inner end of said rod abutting against the tail of the pivoted switch 57. A pull spring 112 connected to the lever 107 causes the roller 106 to hug the periphery of the cam disc 105. From the above it will be seen that each time the lever 107 is rocked by the cam, the pivoted switch 57 is swung to the dotted line position shown in Fig. 16, ready to engage and transfer the next nail brought to it by the transfer wheel 5.

Intermittent or step-by-step rotation is imparted to the two turrets 7 and 43 by a Geneva gear drive clearly shown in Figs. 9 and 10. Keyed on shaft 101 is a bevel pinion 113 meshing with and driving a bevel pinion 114 on the lower end of a vertical shaft 115 journaled in bearings in one of the side frame members 2, and fast on the upper end of shaft 115 is a radial arm 116 equipped with a roller 117 that cooperates in the usual way with a radially slotted Geneva wheel 118, this latter being keyed on the lower end of the drive shaft 44 of the turret 43. Secured to the top surface of the Geneva wheel 118 is a spur gear 119 that meshes with and drives a similar spur gear 120 (Fig. 12) fast on the lower end of the drive shaft 11 of the turret 7. By this mechanism the two turrets 7 and 43 are simultaneously intermittently rotated at equal speeds and in opposite directions.

Referring to Figs. 1, 3 and 9, the nail kick-out device is actuated from the lever 107 by means of a link 121 pivoted at its lower end to lever 107 and at its upper end to an arm 122 fast on a rock-shaft 123 journaled in one of the side frame members, and a rearwardly extending arm 124 also fast on rock-shaft 123, said arm 124 having a forked end 124' (Fig. 9) which straddles a collar 125 that is secured on the lower end of the kick-out rod 85 by a nut 126.

The transfer wheel 5 is driven from the turret shaft 11 by the means clearly shown in Figs. 3 and 12, comprising a bevel pinion 127 attached to the upper side of turret 7 and meshing with a bevel pinion 128 loose on shaft 4. The hub of pinion 128 has a spline connection 129 with the hub of a toothed clutch plate 130 also loose on shaft 4, and said clutch plate 130 is pressed into engagement with a cooperating toothed clutch plate 131 mounted on the face of transfer wheel 5 by a compression spring 132. There is sufficient clearance between the opposed ends of the hubs of pinion 128 and clutch plate 130 to permit the latter to slip over clutch plate 131 in the event that the transfer wheel should become clogged, thus avoiding breakage of the transmission line.

The operation of the machine has, to a considerable extent, been already indicated in the above description of its parts, but may be briefly summarized as follows.

Figure 27:
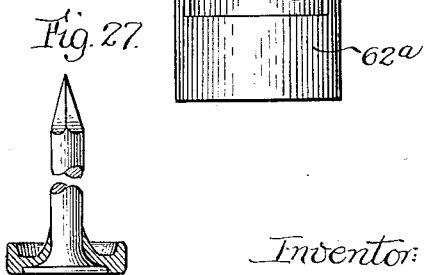
Fig. 27 is an elevation of the capped or washered nail, broken out between its ends, with the head and washer thereof shown in vertical section.

The nails, suspended by their heads, feed by gravity down the nail feed chute 13, the foremost nail coming to rest in the uppermost notch of the transfer wheel 5. As the latter revolves by a step-by-step movement, the nails are carried downwardly, inverted, and come to rest with their heads supported on the table 1, the nail in this position lying directly opposite one of the notches 8 in the turret 7 and in front of the pointed end of the transfer switch 57. At this instant the push rod 111 backs off, and the spring 104 actuates the switch in a direction to push the nail into the notch of the turret. As soon as the first nail has reached the blank feed station, the gravity feed of the washer blanks is started down the chute 18, the foremost blank coming to rest on the plate 19 in one of the notches 17 of the ring 16 and directly over the point of the nail, as clearly shown in Fig. 5. The nail and the blank are then transferred by the turret 90 degrees to a position directly below the washer applying hammer, as shown in Fig. 19. During the latter part of this travel the washer passes off the supporting plate 19 and is caught edgewise by the spring-pressed vertical plate 26 and is thus held from dropping out of the notch 17. At the same time the spring-pressed bar 22 completely closes the open side of the nail notch of the turret, so that the nail is maintained in an upright position and confined against escape. The hammer then descends, driving the washer about half way down on the stem of the nail. As soon as the hammer has cleared the nail on its rising movement, the nail with the washer impaled thereon is carried further by the intermittently revolving turret over the discharge opening 24 (Fig. 4) in the table, the nail being supported during its passage over the opening by the washer as clearly shown in Fig. 4. If a washer fails to register with a nail, the empty nail simply drops out and is discharged through the opening 24 and chute 25. Similarly, if a nail fails to register with a washer, the blow of the hammer simply forces the washer down into the discharge chute 32, whence it is passed out of the machine. As soon as the nail, with the washer impaled thereon, reaches the tangent point of the turrets 7 and 43, it is transferred by the switch 48 (Fig. 11) into the registering notch 47 of the turret 43. By this latter the nail is stepped forward until the head of the nail comes over the die matrix 56 into which it drops. The die punch then descends forcing the washer down onto the under side of the head of the nail and squeezing the soft metal around the periphery of the nail head and to some extent around the shank or neck of the nail, the punch point being suitably shaped to effect this formation, and the diameter of the matrix cavity being slightly greater than the diameter of the nail head, whereby the applied washer takes substantially the form and position relatively to the nail shown in Fig. 27. On the rise of the die plunger the nail kick-out is actuated, and the finished nail falls into the discharge chute and passes out of the machine.

As previously described, should the die plunger fail to register properly with the underlying nail and strike the latter a glancing blow, the locking device 71ª which normally keys the plunger to the cross-head is held against operation, so that the die punch yields upwardly and breakage or injury thereof is avoided.

When the die matrix becomes unduly worn and requires to be replaced by a new matrix, the transfer is readily effected by simply withdrawing the dowel pin 55, and swinging the segment plate 54 out to one side of the machine. The worn matrix may thus be easily knocked out and a new matrix inserted, and the segment plate is then swung back into working position and secured by the dowel pin.

I have herein shown and described a specific embodiment of my invention which in practice has been found to operate efficiently and at high speed; but I do not limit the invention to the specific structural details disclosed, but reserve all such variations and modifications as fall within the spirit and purview of the claims.

I claim:

1. In a nail-capping machine of the type described, the combination of a rotary turret having registering peripheral notches to receive nails and washer blanks, respectively, means for delivering nails successively to the nail-receiving notches, means for supporting the nails in said notches, means for delivering blanks successively to the blank-receiving notches, a hammer operative to impale said blanks on the stems of the nails, a die matrix in which the nails are deposited, a die punch operative to shape the blanks on the heads of the nails, and means for expelling the finished nails from said matrix.

2. In a nail-capping machine of the type described, the combination of a table, a rotary turret on said table having registering peripheral notches to receive nails and washer blanks, respectively, means for feeding nails successively to the nail-receiving notches with the heads of the nails resting on said table, means for feeding blanks successively to the blank-receiving notches above the pointed ends of said nails, a hammer operative to impale said blanks on the stems of the nails, a die matrix in which the nails are deposited, a die punch operative to shape the blanks on the heads of the nails, and means for expelling the finished nails from said matrix.

3. In a nail-capping machine of the type described, the combination of a table, a rotary turret on said table having lower and upper registering peripheral notches to receive nails and washer blanks, respectively, means for feeding nails successively to said lower notches with the heads of the nails resting on said table, means for feeding blanks successively to said upper notches, means for supporting said blanks above the points of the nails, a vertically reciprocable hollow hammer for impaling the blanks on the stems of the nails, a die matrix beyond said hammer in which the nails are deposited, a hollow die punch operative to force said blanks down to, and shape them on, the heads of the nails, and means for expelling the finished nails from said matrix.

4. In a nail-capping machine of the type described, the combination of a table, a rotary turret on said table formed with lower and upper registering peripheral notches to receive nails and washer blanks, respectively, means for feeding nails successively to said lower notches with the heads of the nails resting on said table, means for feeding blanks successively to said upper notches, a vertically reciprocable hollow hammer for impaling the blanks on the stems of the nails, a guard wall opposite the periphery of said turret, a fixed plate supporting said blanks between the blank-feeding means and said hammer, a spring-pressed member clamping the blanks edgewise in the operating zone of said hammer, a die matrix beyond said hammer in which the nails are deposited, a hollow die punch operative to force said blanks down to, and shape them on, the heads of the nails, and means for expelling the finished nails from said matrix.

5. In a nail-capping machine of the type described, the combination of a table, a rotary turret on said table formed with lower and upper registering peripheral notches to receive nails and washer blanks, respectively, means for feeding nails successively to said lower notches with the heads of the nails resting on said table, means for feeding blanks successively to said upper notches, a vertically reciprocable hollow hammer for impaling the blanks on the stems of the nails, a guard wall opposite the periphery of said turret, a fixed plate supporting said blanks between the blank-feeding means and said hammer, a spring-pressed member clamping the blanks edgewise in the operating zone of said hammer, another spring-pressed member confining the nails upright in the operating zone of said hammer, a die matrix beyond said hammer receiving the nails with the blanks impaled thereon, a hollow punch operative to compress and shape said washers on the heads of the nails, and means for expelling the finished nails from said matrix.

6. In a nail-capping machine of the type described, the combination of a table, a rotary turret on said table formed with lower and upper registering peripheral notches to receive nails and washer blanks, respectively, means for feeding nails successively to said lower notches with the heads of the nails resting on said table, means for feeding blanks successively to said upper notches, a vertically reciprocable hollow hammer for impaling the blanks on the stems of the nails, a guard wall opposite the periphery of said turret, a fixed plate supporting said blanks between the blank-feeding means and said hammer, a spring-pressed member clamping the blanks edgewise in the operating zone of said hammer, another spring-pressed member confining the nails upright in the operating zone of said hammer, means associated with said table for discharging from the machine nails that fail to register with blanks and blanks that fail to register with nails, a die matrix beyond said hammer receiving the nails with the blanks impaled thereon, a hollow punch operative to compress and shape said washers on the heads of the nails, and means for expelling the finished nails from said matrix.

7. In a nail-capping machine of the type described, the combination of a table, a turret on said table formed with registering peripheral notches to receive nails and washer blanks, respectively, means for feeding nails successively to the nail-receiving notches with the heads of the nails resting on said table, means for feeding blanks successively to the blank-receiving notches, a hammer operative to impale said blanks on the stems of the nails, a second turret on said table formed with peripheral notches adapted to move into and out of register with the notches of said first-named turret, means for imparting simultaneous step-by-step rotation to said turrets in opposite directions, means for switching nails from said first-named turret to said second turret, a die matrix underlying the peripheral portion of said second turret into which the nails are deposited by the latter, and a die punch mounted to reciprocate above said matrix.

8. In a nail-capping machine of the type described, the combination of a table, a turret on said table formed with registering peripheral notches to receive nails and washer blanks, respectively, means for feeding nails successively to the nail-receiving notches with the heads of the nails resting on said table, means for feeding blanks successively to the blank-receiving notches, a second turret on said table tangential to said first-named turret formed with peripheral notches adapted to move into and out of register with the notches of said first-named turret, gearing connecting said turrets and imparting simultaneous step-by-step rotation thereto in opposite directions, a switch operating to divert nails from said first-mentioned turret to said second turret, a die matrix on said table underlying the peripheral portion of said second turret into which the nails are deposited by the latter, a vertically reciprocating cross-head above said table, a hammer mounted on said cross-head operative to impale blanks on said nails, and a die punch mounted on said cross-head serving to shape and compress said washers on the heads of the nails.

9. In a nail-capping machine, the combination of a table, a vertically reciprocating punch carrier mounted on said table, a die punch mounted on said carrier, a segment plate pivoted on said table, and a die matrix carried by said segment plate and shiftable into and out of axial alinement with said punch by swinging said segment plate around its pivot.

10. In a nail-capping machine, the combination of a table, a pair of vertical guide posts mounted on said table, a cross-head slidable on said guide posts, a die punch mounted in said cross-head, a segment plate on said table pivoted on one of said guide posts, a die matrix mounted in said segment plate and shiftable into and out of axial alinement with said punch by swinging said segment plate around its pivot, and means for locking said segment plate in fixed position on said table.

EDWIN V. SWANGREN.